June 28, 1949.                    A. C. MIDDLETON                    2,474,486
                   CONTROL MECHANISM FOR POSITIONING MASTS
                     IN ALTERNATE, PREDETERMINED POSITIONS
Filed Dec. 5, 1945                                         2 Sheets-Sheet 1

INVENTOR
ALAN C. MIDDLETON
BY
ATTORNEY

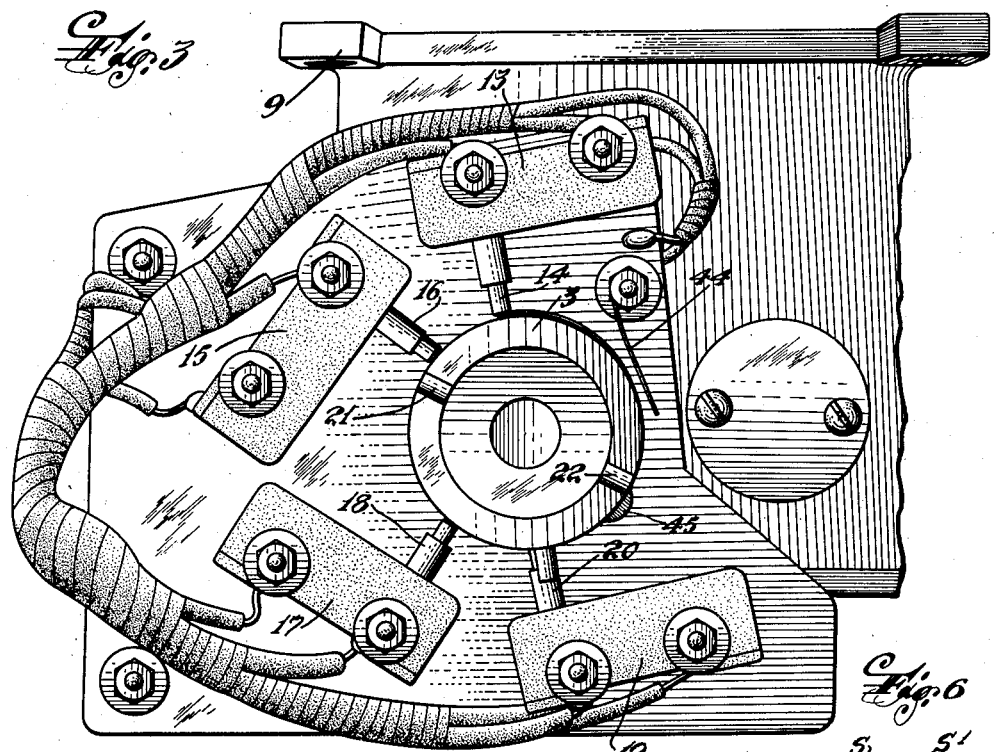

Patented June 28, 1949

2,474,486

UNITED STATES PATENT OFFICE 2,474,486

CONTROL MECHANISM FOR POSITIONING A MAST IN ALTERNATE PREDETERMINED POSITIONS

Alan C. Middleton, Point Pleasant, N. J.

Application December 5, 1945, Serial No. 632,888

7 Claims. (Cl. 318—2)

1

This invention relates to improvements in a control device for selectively positioning a mast in alternate, predetermined positions. The invention more particularly pertains to a mast secured to a shaft at right angles to the longitudinal axis of said shaft and rotatable upon the rotation of said shaft, for selectively positioning the mast at such angle to the horizontal as is found convenient or desirable.

Figure 1:
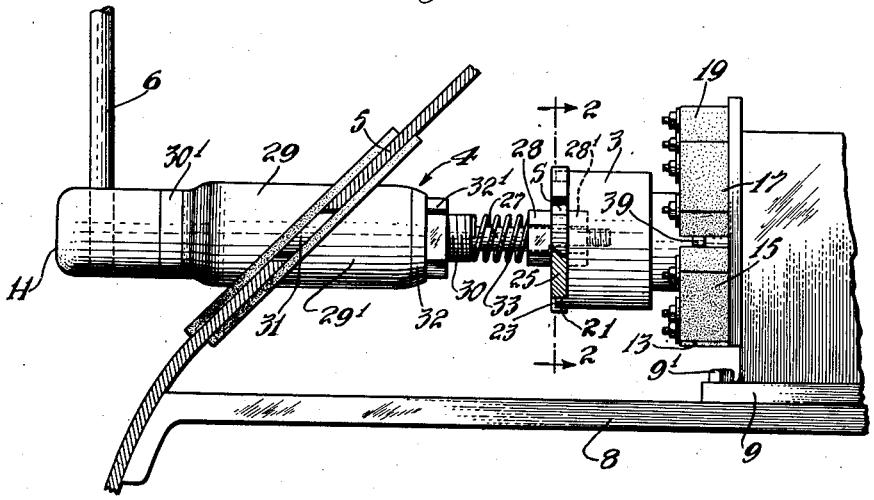
Figure 2:
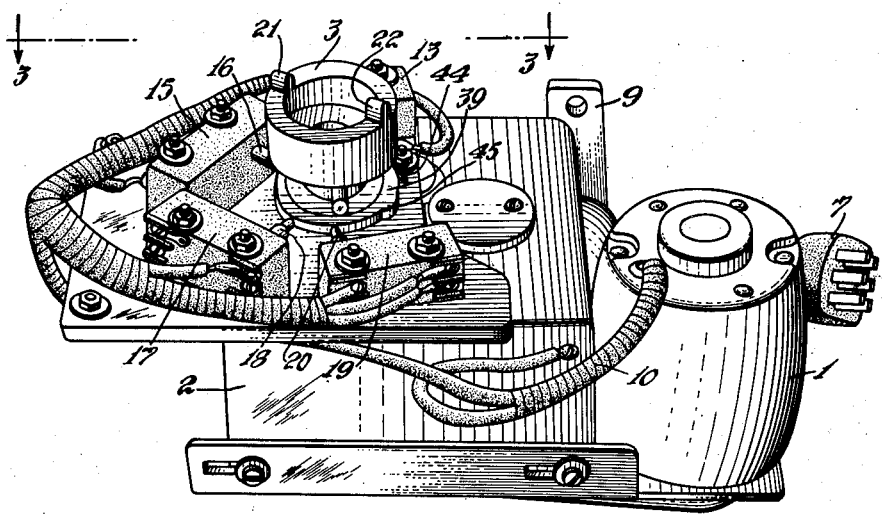

These and other advantageous objects, which will later appear, are accomplished by the structure and arrangement of parts hereinafter described and shown in the accompanying drawings, in which:

Fig. 1 is a fragmentary, partly sectional, side elevational view of a device embodying my invention, shown applied to a wall, Fig. 2 is a perspective view of a portion of a control device embodying my invention, Fig. 3 is a fragmentary top plan view taken on line 3—3 of Fig. 2, Fig. 4 is an exploded view of the shaft and associated bearing and assembly members, Fig. 5 is a fragmentary end view of the shaft and mast carried thereby, showing the latter in full lines in one position and in dotted lines in alternate positions, Fig. 6 is a plan view of a coupling disc member adapted to be used in the assembly of the control device of my invention as hereinafter more particularly set forth, and Fig. 7 is a wiring diagram of a motor control circuit which may be used in carrying out my invention.

As shown in the drawings, the control device of my invention comprises a motor 1 mounted on a platform 9 which may be secured to brackets 8 fixed to the wall 5 of the vehicle or other object to which my invention is to be applied. The motor 1 is mounted adjacent the gear box 2 which is used to drive a coupling 3, the latter being adapted to be connected to a shaft assembly 4 as hereinafter more particularly described.

The shaft assembly may be carried by the wall or partition 5 of the object, substantially all of the parts being secured interiorly of said wall with only the remote end bearing member and associated parts therefor positioned exteriorly thereof, as shown in Fig. 1. A control switching unit 7 is carried by a flexible cable (not shown). The motor 1 may be a reversible A. C. or D. C. motor which is connected by cabling to a source of power as indicated in the circuit diagram of Fig. 7. The gear box 2 contains speed reduction gears which are intermediate and connect the shaft of the motor to the coupling 3 in a manner well known in the electrical art. A cam 39 is keyed to the shaft to which the coupling 3 is keyed, cam 39 being adapted to operate a plurality of micro-switches 13, 15, 17 and 19, having their movable contacts operated by the cam riders 14, 16, 18 and 20. The particular manner in which these micro-switches are opened and closed will be described hereinafter.

The coupling 3 has keys 21 and 22 adapted to be received in keyways or slots 23 and 24 of the coupling disc 25 which is fixed to the mast shaft 27. In the assembly of the device, the mast shaft 27 and associated parts including the terminal coupling disc 25 may be fixed to the wall 5 of the object to which the mast 6 is to be attached, and then by simply assembling the unit shown in Fig. 2 on the wall with the keys 21 and 22 of the coupling 3 entered into the keyways in the coupling disc, the mast shaft may be keyed to the motor 1 by the control means hereinafter described. The structure described permits of the facile assembly and disassembly of the device.

The particular structure illustrated in the drawings and hereinafter described for mounting the shaft on the wall 5 may be varied as desired without departing from the spirit, use and scope of the invention.

In Figs. 1 and 4 I have illustrated one practical method for keying the mast shaft 27 to the control device motor, utilizing bushings 29 and 29' adapted to be mounted externally and internally of the wall 5 to receive a sleeve 31 to assemble the same in that position. The sleeve is adapted to receive a screw 30 provided with an enlarged head 30' at one end for abutment with the bushing 29 and externally threaded at the other end for threading engagement by the nut 32' to hold the parts 30, 31, 29, 29' and the washer 32, which is positioned intermediate the end of the bushing 29' and the nut 32', together, as shown in Fig. 1. The parts just described provide a bearing to rotatably receive the mast shaft 27, the latter being provided at one end with an enlarged head having transverse opening 27' to receive the mast 6 and means, such as a set screw 34, adapted to be threaded into said enlarged head of the shaft and against the mast to hold the latter therein. The other end of the shaft 27 is threaded and may be partially cut away to provide a flat edge (see Fig. 4). The coupling disc 25 is fixed to the threaded end of the shaft 27 by nuts 28, 28' or the like, a spring 33 being interposed between the nut 32' for the assembly of the bushings 29, 29' and the nuts 28, 28' for the assembly of the coupling disc 25 on the shaft 27. The disc 25 is provided with an aperture 26 of a cross-section which is of an outline slightly larger than but corresponds to the cross-section of the threaded end of the shaft 27, so that the disc may be slid on the shaft to position against nut 28 and held there by nut 28', to key the disc 25 to the shaft. By the arrangement described, the bushings 29, 29' are held substantially rigid on the wall 5, while the shaft 27 may be freely rotated therein on rotation of the coupling 3 on engagement with the coupling disc 25 of the shaft 27. Since the mast 6 is at right angles to the longitudinal axis of shaft assembly 4, turning of the shaft will cause the mast to assume the position A, B and C in Fig. 5. Position B may be horizontal, position C vertical and position A an intermediate position. It is, of course, obvious that any number of positions may be provided.

The setting of the mast in a desired position is accomplished in the following manner: The windings 40 and 41 of the reversible motor are connected to a source of power 42 through the micro-switches 13, 15, 17 and 19, and the control switch unit 7 as shown in Fig. 6. The cam 39 has a camming surface 43 capable of simultaneously opening switches 15 and 17. If the control switch 7 is placed on the upper contact, the winding 40 is energized through the normally closed micro-switch 13, causing the shaft to turn until switch 13 is cammed open by the camming surface 43. If then it should be desired to rotate the mast to the intermediate position A, the control switch 7 is thrown to the middle contact and the winding 41 is then energized through switch 17. The winding 40 is not energized because the cam surface 43 holds switch 15 open, as well as switch 13. When the mast is in the upright position, thus energizing the winding 41, the motor will turn the cam in a counterclockwise direction until the cam surface 43 opens the switch 17, as well as maintaining switch 15 open. To lower the mast to a position B, the control switch 7 is placed on the lower contact and the winding 41 is then energized through switch 19, causing the motor to turn in a counterclockwise direction until switch 19 is cammed open, and the motor is again deenergized. In this position both switches 17 and 19 will be open because of the extent of the camming surface 43. Consequently, only winding 40 of the motor can be energized and the motor can only turn in the clockwise direction when the mast has reached this limit of its motion. In the same manner, the motor can be energized only to turn in a counterclockwise direction when the mast is in the other limiting position C.

The device of my invention may be mounted on the wall of a moving vehicle, or other vibrating object. As will be apparent from an inspection of Fig. 1, the shaft 27 and associated parts are maintained taut at all times, preventing loosening of the parts and assuring their proper juxtaposition under constant tension of spring 33.

The mast may be manually rotated if the motor mechanism becomes inoperative for any reason. To further facilitate the manual movements of the shaft 27 to properly position mast 6 if the motor mechanism becomes inoperative for any reason, the coupling disc 25 may be provided with pairs of opposed slots S—S, S'—S', additional to the slots 23 and 24, to receive the keys 21 and 22. Thus, by grasping the enlarged head of the shaft 27 and manually moving the same to the left (in the position of the parts shown in Fig. 1), the shaft 27 and disc 25 carried thereby may be displaced from the coupling 3. The head H (and mast 6 carried thereby) may then be rotated manually to the desired position; on releasing the parts, the shaft 27 will move laterally toward coupling 3 responsive to the tension of spring 33, and disc 25 will receive the keys of coupling 3 in the slots S—S, or S'—S', to return the parts to their coupled position.

While I have shown and described the essential features of one form of the invention, it will be obvious that the invention may be carried out by using other equivalent or supplemental means.

If desired, indicator or pilot light circuits may be selectively closed by the mechanism described in operation to indicate the position of the mast 6.

Indicator bulbs 46, 47, 48 may be equal in number to the positions to which the mast 6 may be rotated and may be differently colored and may be located with the control switching unit 7, remote from the mast 6. As shown in Fig. 7, the micro-switches, as exemplified by switches 13, 19, may be of such structure that when, responsive to the cam riders, said switches open the circuit to the motor, they will automatically close on contacts to close circuits to the pilot or indicator bulbs (and vice versa). Or, the indicator light circuit may be closed by protuberances or cam surfaces, as indicated at 45, on cam 39, making sliding contact with spring fingers as indicated at 44 to close the circuit to the indicator bulb.

The structure described may be used, for example, to secure masts to walls of vehicles or other objects with the mast normally positioned in a horizontal plane, designated by the position B of the Fig. 5, or in a plane intermediate the horizontal plane B and a vertical plane C as indicated in full lines A in said figure, or in any other position relative to the horizontal which is desirable; for example, it may be convenient to position the mast vertically for certain purposes and to lower the mast at other times to bring the same into proximity to the wall 5. Variations of my method and apparatus for controlling the position of the mast will become apparent to those skilled in the art; I have described only one of many possible embodiments of my invention, the scope of which is set forth in the following claims.

Having thus described my invention what I claim as new and desire to secure by Letters Patent, is:

1. A control device for selectively positioning a mast in alternate, predetermined positions and adapted to be secured to a wall comprising motor means, a coupling keyed thereto, keys on said coupling, bushings fixed to the wall, a shaft rotatably mounted in said bushings and extending into the coupling, a mast mounted in the shaft, and a coupling disc fixed to said shaft, said coupling and disc being provided with complementary means for keying the same together for operatively connecting the shaft to the motor, and control means for the motor for selectively operating the motor responsive to the predetermined position of the control means, for predeterminedly rotating the shaft until the mast is rotated to a predetermined position.

2. A control device for selectively positioning a mast in alternate, predetermined positions, and adapted to be secured to a wall comprising motor means, a coupling keyed thereto, keys on said coupling, bushings fixed to the wall, a shaft rotatably mounted in said bushings, and also mounted in the couplings, a mast mounted in the shaft, a coupling disc fixed to said shaft for connecting the shaft to the coupling, said coupling and disc being provided with complementary means for keying the same together for operatively connecting the shaft to the motor, and means on said shaft to key a mast thereto, and control means for the motor for causing the shaft to be rotated until the mast reaches a desired predetermined position and for de-energizing the motor responsively to the mast reaching its predetermined position.

3. A control device for selectively positioning a mast in alternate, predetermined positions, which comprises, in combination, a reversible motor, a shaft assembly connected to the motor for mounting the mast on a vehicle wall and for positioning the mast in a plurality of predetermined positions, the shaft assembly including coupling means, connected to the motor, adapted to be rotated by the motor, a shaft mounted in the coupling means, the shaft having an enlarged head apertured for reception of a mast, the shaft traversing the said wall, a sleeve, enclosing a portion of the shaft, also traversing the wall, bushing members on the sleeve and engaging the wall on opposite sides, resilient retaining means operating on the bushing members for yieldably retaining the bushing members in position against the wall, a source of power for the motor, windings for the motor adapted to operate the motor reversibly, switch means for the motor corresponding to the alternate, predetermined positions of the mast, control means for the motor adapted to be placed in a selected position corresponding to the predetermined positions of the mast, the said control means being operatively connected to the switches for selectively closing an energizing circuit including the motor and the one of the switches corresponding to the desired position of the mast, and means driven by the motor for opening the said one of the switches and de-energizing the motor, responsively to the mast reaching its desired predetermined position.

4. A control device for selectively positioning a mast in alternate, predetermined positions, and adapted to be secured to a wall, comprising motor means, a coupling keyed thereto, key means on the coupling, bushings fixed to the wall, a shaft rotatably in the bushings and extending into the coupling, a mast mounted transversely in the shaft, and a coupling disc fixed to the shaft, the coupling and disc being provided with complementary means for keying the same together for operatively connecting the shaft to the motor, selective control means for causing the mast to reach a predetermined position and for stopping the motor responsively to the mast reaching the predetermined position, and means enabling manual separation of the coupling from the motor means and for enabling manual operating of the shaft assembly.

5. A control device for selectively positioning a mast in alternate, predetermined positions, and adapted to be secured to a wall, comprising reversible motor means, a coupling keyed thereto, keys on the coupling, bushings fixed to the wall, a shaft rotatably mounted in the bushings and also mounted in the coupling, a coupling disc fixed to the shaft for connecting the shaft to the coupling, the coupling and disc being provided with complementary key means for keying the same together for operatively connecting the shaft to the motor, means on the shaft for mounting a mast on the shaft, a source of power for the motor, windings for the motor adapted to operate the motor in reverse directions, switch means for the motor corresponding to the alternate, predetermined positions of the mast, a selector switch connected to the switch means for operating the motor to move the mast to a predetermined position, means for de-energizing the motor responsively to the mast reaching the said predetermined position, and indicator lamps in circuit with the switch means and corresponding to the alternate, predetermined positions of the mast, the motor de-energizing means closing a circuit through a selected lamp when the mast reaches its predetermined position, thereby causing the selected lamp to glow responsively to de-energization of the motor.

6. A control device for selectively positioning a mast in alternate, predetermined positions, comprising a shaft assembly including means for mounting the mast to be positioned, mechanical speed reducing means connecting the motor to the mast through the shaft assembly, means for remotely controlling the motor to position selectively the mast in any one of several predetermined positions, means for causing the motor to confine the travel of the mast to the angle subtended by the outermost of the predetermined positions and for de-energizing the motor responsively to the mast reaching the said predetermined position, the shaft assembly including a mast-carrying shaft, and manually releasable coupling means normally coupling the mast-carrying shaft to the motor for actuation of the shaft by the motor, while enabling manual disconnection of the shaft from the motor for manual operation of the shaft and mast.

7. A control device for selectively positioning a mast in alternate, predetermined positions, comprising a shaft assembly including a shaft carrying the mast to be positioned, a motor for operating the shaft, means connecting the motor to the shaft assembly including a connector, a connector disc mounted on the connector and receiving the mast-carrying shaft, means for securing the shaft to the connector and connector disc, and means for connecting the connector to the motor, a cam mounted on the shaft assembly operated by the motor, circuit means for energizing the motor including a plurality of switches corresponding to the predetermined positions for the mast, each of the switches including a movable contact adapted to be engaged by the cam when the mast reaches a predetermined position for de-energizing the motor, control switching means for causing the motor to turn the mast-carrying shaft into the predetermined position until the said predetermined position is reached, thereby causing the cam to open the corresponding switch to de-energize the motor, the coupling means for connecting the connector to the motor including complementary keys adapted to be separated manually for manual disconnection of the shaft assembly from the motor.

ALAN C. MIDDLETON.

REFERENCES CITED

The following references are of record in the file of this patent:

UNITED STATES PATENTS

| Number | Name | Date |
|---|---|---|
| 2,204,065 | Beizer et al. | June 11, 1940 |
| 2,338,979 | Steinbach | Jan. 11, 1944 |

FOREIGN PATENTS

| Number | Country | Date |
|---|---|---|
| 383,918 | Germany | Oct. 19, 1923 |